United States Patent
Graf

(10) Patent No.: US 9,952,954 B2
(45) Date of Patent: Apr. 24, 2018

(54) MULTICORE PROCESSOR SYSTEM HAVING AN ERROR ANALYSIS FUNCTION

(71) Applicant: SIEMENS AKTIENGESELLSCHAFT, München (DE)

(72) Inventor: Rene Graf, Zirndorf (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 104 days.

(21) Appl. No.: 14/783,251

(22) PCT Filed: Apr. 9, 2013

(86) PCT No.: PCT/EP2013/057382
§ 371 (c)(1),
(2) Date: Oct. 8, 2015

(87) PCT Pub. No.: WO2014/166526
PCT Pub. Date: Oct. 16, 2014

(65) Prior Publication Data
US 2016/0062863 A1    Mar. 3, 2016

(51) Int. Cl.
*G06F 11/00* (2006.01)
*G06F 11/263* (2006.01)
*G06F 11/36* (2006.01)
*G06F 11/22* (2006.01)

(52) U.S. Cl.
CPC ........ *G06F 11/263* (2013.01); *G06F 11/2242* (2013.01); *G06F 11/3632* (2013.01)

(58) Field of Classification Search
CPC .............. G06F 11/263; G06F 11/2242; G06F 11/3632; G06F 11/2236; G06F 11/27; G06F 11/3636; G06F 11/3648; G06F 11/3656
USPC ........................................ 714/35, 34, 25, 30
See application file for complete search history.

(56) References Cited

U.S. PATENT DOCUMENTS

| 5,790,871 A * | 8/1998 | Qureshi .............. G06F 11/2221 702/123 |
| 6,708,326 B1 * | 3/2004 | Bhattacarya .......... G06F 11/362 712/227 |
| 2006/0282707 A1 | 12/2006 | Rosenbluth et al. |
| 2007/0180322 A1 | 8/2007 | Todoroki et al. |
| 2008/0115113 A1 | 5/2008 | Condresu et al. |

\* cited by examiner

*Primary Examiner* — Joseph D Manoskey
(74) *Attorney, Agent, or Firm* — Henry M. Feiereisen, LLC

(57) ABSTRACT

A method for operating a multi-core processor system, wherein different of a program are each executed simultaneously by a different respective processor core of the multi-core processor system includes inserting a breakpoint in a first of the threads for interrupting the first processor core and instead executing an exception handling routine. At least one processor core to be additionally interrupted is determined with the exception handling routine on the basis of an association matrix, and an inter-processor interrupt (IPI) is sent to the at least one processor core by the exception handling routine in order to interrupt the at least one processor core.

10 Claims, 1 Drawing Sheet

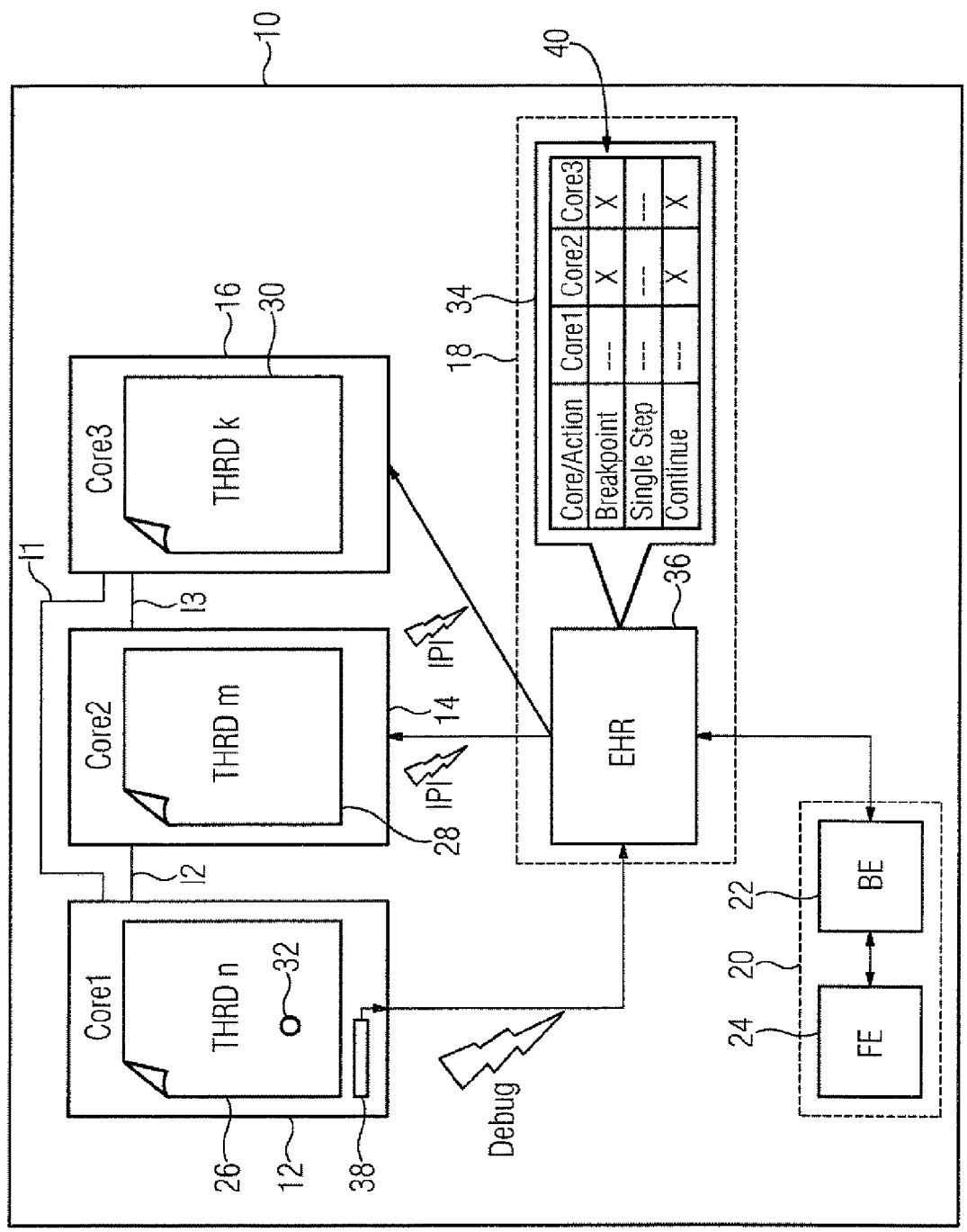

MULTICORE PROCESSOR SYSTEM HAVING AN ERROR ANALYSIS FUNCTION

CROSS-REFERENCES TO RELATED APPLICATIONS

This application is the U.S. National Stage of International Application No. PCT/EP2013/057382, filed Apr. 9, 2013, which designated the United States and has been published as International Publication No. WO 2014/166526.

BACKGROUND OF THE INVENTION

The invention relates to a method for operating a multicore processor system, by means of which different threads (program parts or program paths) of a program are executed by a plurality of processor cores of the multicore processor system at the same time, each processor core executing a different one of the threads. The invention also includes a multicore processor system having a debugging device for analyzing the program. Finally, the invention also includes a computer program product which can be used to enhance a conventional multicore processor system in the sense of the method according to the invention.

In order to provide so-called "true" multitasking, a computer may comprise a plurality of processors or else one processor having more than one processor core. Such an arrangement comprising a plurality of processors and/or a plurality of processor cores inside a processor is referred to as a multicore processor system here. Such a multicore processor system is used to execute individual program parts (threads), which can be executed independently of one another, in a truly parallel manner, that is to say at the same time. Programs which internally consist of a plurality of threads can be distributed among virtually any desired number of such processor cores, with the result that more than only one thread is always active.

However, many such programs constructed in this manner have hitherto often been executed only on so-called single-core processor systems. Only pseudo-multitasking can be provided by a single-core processor system. In this case, the individual threads of a program are executed in rapid alternation in succession, with the result that there is no true temporal parallelism. If such a program is now executed on a multicore processor system, this may result in completely new error patterns if the program is not correctly structured at all points for a multicore processor system.

Error searching is called debugging (error=bug). The structure of a debugger generally consists of two parts: the frontend, which provides the programmer with various possibilities for controlling error analysis, and the backend, which then looks after the execution of these control commands while the frontend continues without being influenced. These two units (frontend and backend) are themselves programs and can also run on computers other than the multicore processor system, which is widespread, in particular, in the field of embedded systems.

So-called debug probes are an additional possible form of implementation of a backend unit. This hardware circuit processes debug commands or debug instructions from the frontend and forwards them to the multicore processor system via special hardware debug interfaces. An example of such a debugging system emerges from the JTAG standard (Joint Test Action Group, IEEE standard 1149.1). In this case, the processor cores can be individually addressed in multicore processor systems.

Debugging generally provides two important mechanisms which stop a running program, that is to say interrupt the execution of the program on a processor core. The program is either stopped from the outside or a breakpoint was previously set in the program code of the program, which breakpoint stops the program when the program counter of the relevant processor core reaches this point irrespective of the thread in which the program is currently situated. There are then substantially also two possibilities for how the program is continued. Either only an individual command in the current thread is executed (single step) and the processor is then interrupted again or the program is continued in full (continue command), which may again result in thread changes.

In single-core processor systems, the entire processor stops, that is to say the program per se is not executed any further, in the case of both interruption possibilities, thus ensuring that all threads and therefore all data in the program which describe the current program state are exactly in the state which is present when the one thread stops. In the case of continuation by means of a single-step command, only those program data which are changed by the current thread by means of the one program step likewise change.

All of this no longer applies to multicore processor systems, with the result that some problems arise in order to stop the program in a consistent state and in order to be able to draw reliable conclusions on possible causes of errors from the program data. This is because, if the threads of the program are distributed among a plurality of processor cores and the execution of a thread is then interrupted because the thread runs onto a breakpoint, only this one processor core also initially stops, while all other processor cores and therefore also the other threads of the program continue, that is to say are executed further by the other processor cores. In order to prevent continuation, a debugger must also stop the other processor cores after detecting a program interruption in one processor core. The following mechanism is used for this purpose. If a thread runs onto a breakpoint, exception handling is triggered in the processor core affected, that is to say a so-called exception handling routine is processed by the processor core affected. This routine reports the event to the backend of the debugger which in turn forwards the event to the frontend. The frontend has the corresponding information relating to the threads and the processor cores, with the result that it can likewise stop the processor cores on which the other threads of the same program are running by means of a command to the backend.

However, this process lasts for the order of magnitude of milliseconds, which may result in the program to be analyzed already being very much further in some threads than it was at the time of the interruption at the breakpoint in the one thread. Entirely different threads may likewise be active in the meantime and threads may even have ended. This applies, in particular, since modern processors have clock frequencies in the Gigahertz range, with the result that approximately 1 million commands are executed per millisecond. Therefore, no consistent indication of the program data in the program upon reaching a breakpoint can be established in this way. Furthermore, it is also unknown what is actually supposed to happen in a multicore processor system in the event of a single-step command. Does only the one thread which caused the interruption continue for one program step or are all threads which are currently active on the other processor cores likewise supposed to be executed further by one program step?

SUMMARY OF THE INVENTION

The invention is based on the object of providing more accurate error analysis (debugging) for a program having a plurality of threads in a multicore processor system.

The object is achieved by a method for operating a multicore processor system having a plurality of processor cores, wherein different threads of a program are executed simultaneously on different processor cores. The method includes inserting a breakpoint as a debug instruction into a first of the threads that is executed by a first of the processor cores; during execution of the debug instruction, interrupting with the first processor core the execution of the first thread and instead executing an exception handling routine; providing an assignment matrix that identifies another processor core of the plurality of processor cores to be additionally interrupted when the first processor core interrupts the execution of the first thread according to the debug instruction; determining with the exception handling routine of the first processor core at least one further processor core of the plurality of processor cores to be additionally interrupted based on the assignment matrix; and transmitting with the exception handling routine an inter-processor interrupt (IPI) to the at least one further processor core for interrupting the at least one further processor core. The object is further achieved by a multicore processor system and a computer program product carrying out the method.

The method according to the invention is based on the situation described at the outset whereby different threads of the program to be analyzed are executed at the same time by another respective processor core of the multicore processor system. In the method, a breakpoint is now inserted in a manner known per se into a first of the threads which is executed by a first of the processor cores. This control possibility for interrupting a thread in a targeted manner is referred to in summary below as a debug instruction.

When the debug instruction is being executed by the first processor core, such a debug instruction therefore causes the first processor core to interrupt the execution of the first thread. According to today's hardware standard, upon reaching a debug instruction, a processor core then executes an exception handling routine instead of the thread.

In the method according to the invention, an assignment list or assignment matrix is now provided (preferably before the start of the program), which assignment list or matrix stipulates which other processor core is intended to be additionally interrupted if the first processor core is interrupted, that is to say if the first processor core interrupts the execution of the first thread according to the debug instruction. Furthermore, said exception handling routine of the first processor is designed to use this assignment matrix to determine at least one processor core to be additionally interrupted. In other words, the decision regarding which other processor cores should also be stopped is not determined by informing the backend and then informing the frontend, like in the prior art, but rather is determined directly by the exception handling routine, to be precise using the assignment matrix. In order to also obtain a faster reaction of the other processor cores determined in a multicore processor system, the method according to the invention also provides for an inter-processor interrupt (IPI) for interrupting this at least one determined processor core to be transmitted to said processor core. Such an IPI signal is transmitted to the other processor cores directly via lines which run, in particular, between the processor cores. The IPI signal can be triggered by the exception handling routine of the first processor core. This process lasts for only a few nanoseconds, with the result that the threads on the other processor cores have continued for only a few commands and the program data are as consistent as possible.

By virtue of the fact that the method according to the invention combines the existing exception handling mechanisms, on the one hand, and the inter-processor interrupt mechanisms, on the other hand, in a hardware-based manner, the result is a novel flexible debug system which ensures data consistency in a multicore processor system without the need to know more about the program to be analyzed (debugged) for this purpose. The method according to the invention therefore has the advantage that only a few nanoseconds (at most one microsecond) elapse between the reaching of a debug instruction in a thread on a first processor core and the stopping of the other processor cores, whereas more than one millisecond or even up to one second elapses as a result of an interruption which is controlled by the backend or even the frontend. Therefore, as a result of the method according to the invention, not only the first thread but also the other threads are in virtually the state they were in when the debug instruction was executed in the first thread. Another advantage results from the fact that the assignment matrix can be used to deliberately select which other processor cores are stopped. It is not necessary here to stop all threads belonging to the program.

Only after all selected processor cores have been stopped, that is to say after the respective threads executed on the processor cores have been interrupted, are the backend and then the frontend preferably informed of the stopping of the program. For this purpose, according to one embodiment of the method, a signal which signals the interruption is emitted to the backend and/or the frontend of the debugger. This development results in the advantage that the frontend can be configured in the same way as a conventional frontend apart from the fact that more consistent program data are now available for the frontend.

The assignment matrix preferably stipulates, not only for one processor core but for a plurality of the processor cores, which other processor cores are respectively intended to be stopped upon reaching a debug instruction. In this case, it is not even necessary to stipulate that these other processor cores are likewise intended to be stopped. A different reaction can also be stipulated here. If any processor core therefore runs onto a breakpoint, the assignment matrix states which other processor cores are likewise intended to be stopped in this case or are otherwise intended to be informed. In this case, the assignment matrix also need not be symmetrical, with the result that, although processor core N stops, for example, if processor core M runs onto a breakpoint, this is not the case the other way round. This results in the advantage that errors can be located in a targeted manner by forming a suitable assignment matrix by virtue of one thread being interrupted by another thread once and not being interrupted another time, for example. In conjunction with a single-step command, the assignment matrix can also stipulate whether or not a particular other processor core is likewise intended to execute an individual program step in a parallel manner. In this case too, the assignment matrix may be asymmetrical in order to ensure that the data remain consistent in terms of contents and time.

The assignment matrix may also be used to stipulate what is supposed to happen when a debugger generates a continue signal after the first processor core and the at least one additionally determined processor core have been interrupted. According to one embodiment of the method, the debugger or one of the interrupted processor cores uses the assignment matrix here to determine which of the processor cores the continue signal is intended to be forwarded to. According to the assignment matrix, the continue signal is therefore then passed not only to one processor core but to a plurality of the interrupted processor cores. This results in the advantage that the interrupted processor cores also again begin the execution of their respective thread in a synchronous manner.

According to one embodiment of the method, the debugger or one of the interrupted processor cores accordingly uses the assignment matrix to determine which of the processor cores a single-step command is intended to be forwarded to, which command was generated by a debugger after the first processor core and the at least one additionally determined processor core had been interrupted. According to the assignment matrix, the single-step command is therefore then passed not only to one processor core but rather to a plurality of the interrupted processor cores. This results in the advantage that the interrupted processor cores also again execute their respective thread further by one command in a synchronous manner.

The assignment matrix can be defined, for example, in the backend program and can be configured, for example, by a user in the frontend. A user can thus stipulate how this assignment matrix individually describes which processor cores are supposed to react to actions of another processor core and in what manner.

In this case, it must be heeded that, according to the method, it is first of all only stipulated which other processor core is intended to be stopped. However, a particular processor core is often not of interest, but rather a particular thread which is likewise intended to be stopped when a particular other thread is interrupted by a debug instruction. It must therefore be ensured that the correct thread is executed on the interrupted processor core. For this purpose, according to one embodiment of the method, a configuration device, that is to say the debugger for example, determines (manually in the frontend or automatically in the backend), before the start of the program, which threads are intended to be dependent on one another with respect to the interruption and stipulates which of the threads is intended to be executed by which of the processor cores. The assignment matrix is then generated according to the dependence determined and the threads are assigned to the correct processor cores. The practice of assigning threads to particular processor cores is known per se from the prior art.

However, according to one development of the method, the assignment matrix can also be changed at any time by a debugger, in particular a frontend of a debugger, or another institution if the analysis of the program to be debugged requires this, for example. For this purpose, the program to be debugged advantageously need not be restarted. The assignment matrix can therefore be defined before the program is started but can also be subsequently changed again during debugging of the program.

As already stated, the invention also includes a multicore processor system having a debugging device. This debugging device is designed, on the one hand, to stipulate an exception handling routine of at least one processor core of the multicore processor system and, on the other hand, to provide an assignment matrix for the exception handling routine. Furthermore, the debugging device is designed to operate the multicore processor system according to one embodiment of the method according to the invention.

Finally, the invention also includes a computer program product which can likewise be used to operate a conventional multicore processor system in the same way as a multicore processor system according to the invention. A debugging program is provided for this purpose on a storage medium, for example a CD-ROM or a hard disk, which debugging program is designed to carry out one embodiment of the method according to the invention during execution of the debugging program by a multicore processor system. As already stated at the outset, the debugging program can also be executed on a computer system coupled to the multicore processor system, in particular in an embedded system. This embodiment of the debugging program is also included in the program product according to the invention.

BRIEF DESCRIPTION OF THE DRAWING

The invention is explained again below using a specific exemplary embodiment. In this respect, FIG. 1 shows a multicore processor system which may be, for example, a development system for embedded applications.

DETAILED DESCRIPTION OF PREFERRED EMBODIMENTS

The multicore processor system 10, or system 10 for short, has a plurality of (here, by way of example, three) processor cores 12, 14, 16 (core 1, core 2, core 3), a memory 18 and a debugging device 20 having a backend 22 (BE) and a frontend 24 (FE). The processor cores 12, 14, 16 are connected to one another by means of interrupt lines I1, I2, I3.

The debugging device 20 may comprise, for example, a program module for the backend 22 and a program module for the frontend 24. The debugging device 20 may be executed, for example, by a further processor core (not illustrated here).

The processor cores 12, 14, 16 execute a program which is intended to be analyzed by means of the debugging device 20. In the example, the program comprises three threads (THRD) 26, 28, 30, of which the thread 26 (THRD n) is executed by the processor core 12, the thread 28 (THRD m) is executed by the processor core 14 and the thread 30 (THRD k) is executed by the processor core 16. For the analysis, an operator (not illustrated) inputs at the frontend 24 that the execution of the thread 26 by the processor core 12 is intended to be interrupted at a particular point in the program text of the thread 26. For this purpose, the operator sets a breakpoint 32 in a manner known per se, that is to say indicates a program structure in the thread 26 at which the execution of the thread 26 is intended to be interrupted. The input by the operator is forwarded from the frontend 24 to the backend 22 which inserts the breakpoint 32 as a debug instruction in the program code of the thread 26.

However, if the breakpoint 32 is reached during the execution of the thread 26 by the processor core 12, not only the thread 26 is intended to be stopped, but the other threads 28, 30 of the program are also intended to be stopped as quickly as possible, that is to say at the same time or at least only a few clock cycles later as far as possible.

The switching-off of the other processor cores 14, 16 of the multicore processor system 10 by the debugger frontend 24 or else by a hardware probe, as is known from the prior art, is much too slow for this purpose since, especially in the case of a real-time system, the other processor cores 14, 16 process too many commands before they are stopped. This results in a representation of the program data which is inconsistent and therefore cannot be used by the operator to analyze the program.

Therefore, in the system 10, a solution is provided using a processor core action matrix (core/action matrix) or matrix 34 for short which can be programmed from the outside, that is to say using the debugging device 20. The matrix 34 is part of an exception handling routine (EHR) or debug routine 36 for short. The matrix 34 is an assignment matrix.

The debug routine 36 may have been stored in the memory 18 by the debugging device 20, for example in the backend 22. For the processor core 12, a jump address 38 which indicates a starting point of the debug routine 36 in the memory 18 has likewise been stipulated in a register, for example, by the debugging device 20, in particular the backend 22. As soon as the processor core 12 reaches the breakpoint 32 during execution of the thread 26, it interrupts the execution of the thread 26 and executes the program code which starts at the memory address indicated by the jump address 38 (symbolized as a "debug" event in the figure). In other words, the processor core 12 executes the debug routine 36. The debug routine 36 controls the processor core 12 to the effect that it transmits an inter-processor interrupt signal (IPI) to the other processor cores 14, 16 via the interrupt lines I1, I2, as a result of which said processor cores likewise interrupt the execution of the respective threads 28, 30. The debug routine 36 uses the matrix 34 to determine which processor cores are intended to be interrupted by the IPI signal. In this case, the matrix shown in the FIGURE shows only the effect of the matrix 34 by way of example. The thread n (26) runs onto breakpoint 32 and therefore triggers the debug exception. The debug routine 36 evaluates the matrix 34 and obtains therefrom the information that, upon the occurrence of a breakpoint 32 in the processor core 12 (core 1), the processor cores 14 and 16 (core 2, core 3) should be stopped (see the first row 40 of the matrix 34). Accordingly, during its execution by the processor core 12, the debug routine 36 stops the processor cores 14 and 16 and the threads m and k (28, 30) by means of an IPI signal. Corresponding actions for the cases of a single-step command ("single step" row) and a continue command ("continue" row) may be defined in the matrix 34.

The resulting trailing between the reaching of the breakpoint 32 and the stopping of the processor cores 14 and 16 is only a few clock cycles long, that is to say only a few commands in the threads 28, 30 are executed after the breakpoint 32 has been reached, with the result that the state of the processor cores 14 and 16 at the decisive time at which the breakpoint 32 is reached by the processor core 12 differs only slightly from the state of the processor cores 14, 16 upon the stopping of the latter. Even the last change steps can be reversed from an analysis of the program code of the threads 28, 30, with the result that the state of the stopped threads 28, 30 at the time at which the breakpoint 32 is reached can be reconstructed.

The solution using an externally programmable matrix 34 therefore provides the necessary speed to stop the other affected processor cores with as little delay as possible both on account of its flexibility and as a result of the implementation in the exception handling of the processor (exception handling routine). Further advantages arise from the admissible asymmetry of the matrix, with the result that, although the stopping of one processor core likewise stops other processor cores, it is not necessarily the case the other way round if one of the other processor cores stops.

The invention claimed is:

1. A method of operating a multicore processor system, said multicore processor system executing multiple different program threads at the same time using respective processor cores for each thread, a first program thread being executed by a first processor core having an exception handling routine, said first program thread including a debug instruction, said debug instruction providing a breakpoint, said method comprising the steps of:
   providing an assignment matrix identifying at least one additional processor core where execution of one of the program threads by the additional processor core is to be interrupted by the exception handling routine when the debug instruction interrupts the execution of the first program thread in the first processor core at the breakpoint,
   interrupting execution of the first program thread by the first processor core when the execution of the first program thread reaches the breakpoint, said first processor core then executing an exception handling routine, and
   transmitting an inter-processor interrupt to the additional processor core using the exception handling routine, said inter-processor interrupt being configured to interrupt the execution of a program thread by the additional processor core.

2. The method of claim 1, further comprising the step of transmitting a signal indicating the interruption to at least one of a backend and a frontend of a debugging device only after the first processor core and the at least one additional processor core have been interrupted.

3. The method of claim 1, wherein the assignment matrix defines a type of response by the at least one further processor core of the plurality of the processor cores to an interruption due to a debug instruction.

4. The method of claim 3, wherein the assignment matrix is asymmetrical.

5. The method of claim 1, further comprising the steps of:
   generating a continue signal after the first processor core and the at least one further processor core have been interrupted, using a debugging device
   determining which processor cores the continue signal is to be forwarded to using the debugging device or one of the interrupted processor cores and the assignment matrix, and
   forwarding the continue signal to several of the interrupted processor cores using the assignment matrix.

6. The method of claim 1, further comprising:
   generating a single-step command after the first processor core and the at least one further processor core have been interrupted using a debugging device,
   determining the processor cores to which the single-step command is to be forwarded using the debugging device or one of the interrupted processor cores, based on the assignment matrix, and
   forwarding the single-step command to several of the interrupted processor cores using the assignment matrix.

7. The method of claim 1, further comprising the steps of,
   a) determining which of the different threads are dependent on one another with respect to the interruption,
   b) determining which of the different threads is to be executed by which of the different processor cores, and
   c) generating the assignment matrix based on the determined dependence of the different threads, and assigning the different threads to the respective different processor cores,
   before the program threads are executed, using a configuration device.

8. The method of claim 1, wherein the assignment matrix is changed after execution of a program thread starts.

9. A multicore processor system configured to execute a program having multiple different program threads, said multicore processor system comprising:

a plurality of processor cores, configured to execute respective different program threads simultaneously on respective different processor cores, said processor cores including a first processor core, said first processor core being configured to execute a first program thread and having an exception handling routine; and a debugging device having debug instructions, said debugging device being configured to insert a debug instruction in the first program thread, said debug instruction including a breakpoint configured to interrupt execution of the first program thread by the first processor core at the breakpoint and to execute the exception handling routine of the first processor core when the debug instruction interrupts execution of the first program thread at the breakpoint, said debugging device being configured to provide an assignment matrix that identifies at least one additional processor core to be interrupted by the exception handling routine when the execution of the first program thread by the first processor core is interrupted at the breakpoint, said exception handling routine being configured to transmit an inter-processor interrupt to the at least one additional processor core that interrupts execution of a program thread by the at least one additional processor core.

10. A computer program product having a debugging program stored on at least one non-transitory storage medium, said debugging program being configured to be loaded into a memory of a multicore processor system having a plurality of processor cores or loaded into a memory of a computer system coupled to the multicore processor system and executed by the multicore processor system, said multicore processor system having an exception handling routine and executing multiple different program threads at the same time using a respective processor core for each thread, a first program thread being executed by a first processor core having an exception handling routine, said first program thread including a debug instruction, said debug instruction providing a breakpoint, said debugging program comprising:

a routine using an assignment matrix to identify at least one additional processor core where execution of a program thread by the additional processor core is to be interrupted when the debug instruction interrupts the execution of the first program thread by the first processor core at the breakpoint, a routine interrupting the first program thread at the breakpoint in the first program thread by executing the debug instruction; and a routine using the exception handling routine to provide an inter-processor interrupt when the debug instruction is executed in the first program thread that interrupts the execution of the program thread by the additional processor core.

* * * * *